United States Patent [19]

Krikorian

[11] Patent Number: 4,550,749

[45] Date of Patent: Nov. 5, 1985

[54] ADJUSTABLE CHECK VALVE

[75] Inventor: Donald J. Krikorian, Cranston, R.I.

[73] Assignee: C. R. Bard, Inc., Murray Hill, N.J.

[21] Appl. No.: 588,289

[22] Filed: Mar. 12, 1984

[51] Int. Cl.$^4$ .............................................. E16K 15/14
[52] U.S. Cl. .................................... 137/843; 137/854
[58] Field of Search ......................... 137/843, 852, 854

[56] References Cited

U.S. PATENT DOCUMENTS

| | | | |
|---|---|---|---|
| 2,128,050 | 8/1938 | Landis | 137/854 |
| 2,270,469 | 1/1942 | Osborn | 137/854 |
| 3,037,522 | 6/1962 | Millan | 137/854 X |
| 3,124,488 | 3/1964 | Ruetschi | 137/854 X |
| 3,889,710 | 6/1975 | Brost | 137/843 X |
| 3,954,121 | 5/1976 | Kardos | 137/854 |

FOREIGN PATENT DOCUMENTS

| | | | |
|---|---|---|---|
| 3023928 | 1/1982 | Fed. Rep. of Germany | 137/854 |
| 594098 | 11/1947 | United Kingdom | 137/854 |
| 976187 | 11/1982 | U.S.S.R. | 137/843 |

*Primary Examiner*—Robert G. Nilson
*Attorney, Agent, or Firm*—Wolf, Greenfield & Sacks

[57] ABSTRACT

A fluid check valve has a disk shaped resilient valve element mounted along the flow path of the valve to permit the flow in one direction only. The disk is maintained normally in a dish shape, with dished disk being biased toward and against the valve inlet to normally bias the valve in a closed configuration. The operating characteristics of the valve, such as cracking pressure and minimum flow rate, are adjustable by a disk mount which enables the biasing force to be varied. The mount supports the disk and enables slight adjustable movement of the disk axially toward and away from the inlet so as to vary the degree of dishing of disk and, therefore, its resilient biasing force. In another aspect of the invention the valve is provided with improved outlet characteristic which minimize the back pressure of the valve and enable it to be responsive quickly even at very low flow rates and pressure differentials.

10 Claims, 10 Drawing Figures

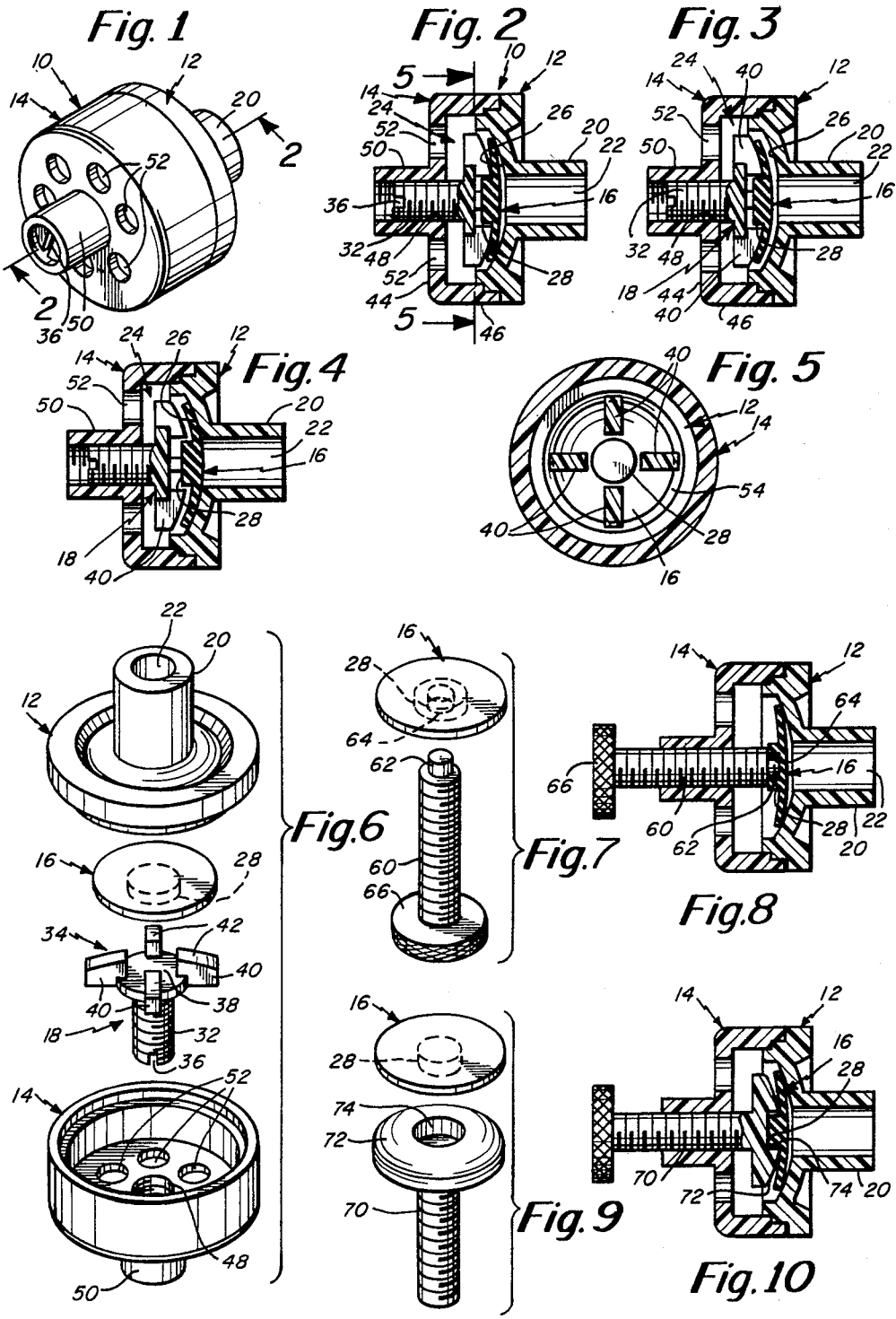

ADJUSTABLE CHECK VALVE

BACKGROUND OF THE INVENTION

This invention relates to fluid flow controls and is concerned particularly with improvements in check valves of the type having a valve element in the form of a flexible disk mounted adjacent the valve seat. The valve element and seat are arranged so that a pressure differential in one direction will press the disk into sealing relation with the seat while a pressure differential in the opposite direction will flex the disk to permit fluid to flow past it, to and through the valve outlet. A commercially available valve of this type is described in U.S. Pat. No. 3,889,710 to Borst. The device described in that patent includes a housing which defines a valve chamber having generally opposed inlet and outlet passageways. A concave seating surface surrounds the inlet passageway within the valve chamber. A normally flat elastomeric disk valve is located in generally facing relation to the concave seating surface and is biased toward and against the concave seating surface by an abutment structure which bears against the central region of the disk thereby maintaining the periphery of the disk in sealing contact with the concave seating surface. Increased fluid pressure against the downstream face of the disk increases the sealing engagement with the seating surface. Increased pressure on the upstream face of the disk causes it to flex to a more dished configuration, bending further about the abutment structure and breaking the seal of the seating surface to allow fluid to flow around the periphery of the disk to the outlet passageway.

The device described in Borst U.S. Pat. No. 3,889,710, although usable in situations where a high degree of precision is not required, and where flow rates and pressure differentials are at moderate levels, presents a number of difficulties when used in high precision environments. It also presents difficulties when used with relatively high flow rates and pressure differentials as well as with relatively low flow rates and pressure differentials. For example, when used in relatively high flow rate applications the valve displays a tendency to build up substantial back pressures. When used in applications calling for relatively low flow rates and low pressure differentials, the Borst valve displays variations in its operating characteristics. For example, a significant feature of the valve described in the Borst patent relates to the ability of the valve disk to shift about within the valve housing. The degree to which the disk is permitted to shift about tends to change the operating characteristics of the valve as the disk shifts to various positions in the housing. For example, the cracking pressure of the valve may change somewhat from time to time as the valve operates. While this may be an acceptable feature where critical applications and precise operation is not essential, it presents a number of difficulties when precise operation is required. This difficulty is magnified particularly in applications calling for low pressure differentials and low flow rates.

Another difficulty presented by the Borst valve is that it is difficult to manufacture such valves with repeated precise control over the cracking pressure of the valve (i.e., the pressure at which the valve shifts from its closed to its open position). The Borst type of valve tends to display significant variations from valve to valve which, in low pressure relatively delicate systems may be intolerable and result in unreliable operation of the system which the valve is meant to control.

Another disadvantage with the Borst type of valve is that, once manufactured, it is operable only at a single pressure level and cannot be accommodated to varied conditions and flow parameters. Thus, should a different cracking pressure of other variation in operating characteristics be required the valve must be replaced in its entirety.

The operating characteristics of the Borst valve are determined by the internal configuration of the valve housing and its cooperation with the valve element. Thus another problem with the valve is that its manufacture is highly sensitive to varying manufacturing conditions and, therefore, necessarily results in relatively high manufacturing costs to monitor and control those conditions.

Still another difficulty presented with the Borst type of valve is that it does not have as rapid a response, particularly in relatively low flow rate and low pressure differential situation with the result that the valve may not act as quickly as desired.

It is among the general objects of the invention to provide a disk check valve which overcomes the foregoing and other difficulties.

SUMMARY OF THE INVENTION

The valve includes a housing which defines an interior chamber having an inlet and an outlet. The portion of the chamber which surrounds the inlet defines a concave seating surface. The outlet is formed in the housing at the other end of the chamber. An elastomeric disk is supported so that its peripheral margin contacts the concave seating surface. The disk support engages the center of the disk and causes the disk to dish toward the concave seating surface thereby biasing the disk toward the seating surface. The disk support is adjustable toward and away the seating surface to vary the extent of dishing and the biasing force applied to the disk.

In the illustrative embodiment the disk is provided with a central boss at its downstream face which engages the disk support. In the illustrative embodiments of the invention the disk support is formed at the end of a post which is threaded through the housing along the axis of the concave seating surface. The other end of the post is exposed at the outside of the housing and can be rotated to adjust the position of the post and the degree of biasing applied to the disk. Once the valve is intalled in its intended environment it may be adjusted simply and easily to assure operation of the valve as desired.

Another aspect of the invention relates to the location and configuration of the outlet so as to minimize back pressure and enable fact acting response of the valve. To that end, the valve is provided with relatively straight flow paths, avoids excessively tortuous internal flow paths and has a large outlet area which is greater than the narrowest portion of the flow path.

It is among the objects of the invention to provide a fluid check valve usable with precision low flow conditions as well as low pressure differentials.

Another object of the invention is to provide a disk check valve which is fast acting under a wide range of conditions.

Another object of the invention is to provide a disk check valve in which the cracking pressure can be controlled by the user and can be adjusted to precise levels.

Still another object of the invention is to provide a disk check valve having simplified adjustment means by which the operating characteristics of the valve can be adjusted.

Another object of the invention is to provide a disk check valve which achieves the above objects yet which also is simple and relatively inexpensive to manufacture.

DESCRIPTION OF THE DRAWINGS

The foregoing and other objects and advantages of the invention will be appreciated more fully from the following further description thereof, with reference to the accompanying drawings wherein:

FIG. 1 is a perspective illustration of the assembled valve;

FIG. 2 is a sectional illustration of the valve in its relaxed configuration;

FIG. 3 is a sectional illustration of the valve similar to FIG. 2 but illustrating the valve in its open configuration permitting flow;

FIG. 4 is a sectional illustration of the valve similar to FIGS. 2 and 3 and showing the valve in a fully obstructing configuration to prevent reverse flow;

FIG. 5 is a sectional illustration seen along the line 5—5 of FIG. 2;

FIG. 6 is an exploded illustration of the elements of the valve;

FIG. 7 is an illustration of another embodiment of support for the disk valve;

FIG. 8 is a sectional illustration of the valve in its relaxed configuration incorporating the modified disk support shown in FIG. 7;

FIG. 9 is an illustration of another adjustable support for the disk valve; and

FIG. 10 is a sectional illustration of the valve embodying the support illustrated in FIG. 9.

DESCRIPTION OF THE ILLUSTRATIVE EMBODIMENT

As shown in FIGS. 1 and 6 the valve includes a housing indicated generally by the reference character 10. The housing preferably is molded from appropriate material such as nylon or other suitable plastic. The housing 10 preferably is formed in two parts including an inlet section 12 and an outlet section 14. The valve also includes an elastomeric disk 16 and a disk support 18 (see FIG. 6). The disk 16 preferably is molded from any of a variety of rubber compounds of similar materials such as latex, silicone rubber or the like. The disk support 18 may be formed from a plastic and may be of the same plastic from which the housing sections 12, 14 are made.

The inlet section 12 includes an integral inlet tube 20 which defines an inlet passageway 22. The downstream end of the inlet passageway 22 opens into a chamber 24 defined within the housing 10. The downstream facing, chamber-defining surface of the inlet section 12 is formed in a concave, dished shape to define a seating surface 26 for the disk 16.

The disk 16 is molded and, in the illustrative embodiment, may be molded in a normally flat shape which, when placed within the assembled valve may assume a normal slightly dished shape suggested in FIG. 2. The downstream face of the disk 16 preferably is formed to include a central boss 28 which cooperates with disk support 18 to support the disk as described more fully below.

The disk support 18 includes a threaded post 32 having a disk retaining head 34 at its upstream end (see FIG. 6). The downstream end of the post 32 is slotted, at 36, to receive a screwdriver. The disk retaining head 34 includes a platform 38 and a plurality of circumferentially spaced wings 40 which extend radially outwardly from the platform 38. As illustrated in FIG. 5 the radially inwardly disposed ends of the wings 40 define a socket to receive the central boss 28 of the disk 16. The diametral dimension between the inner ends of the wings 40 is slightly larger than the diameter of the central boss 28 on the disk 16 to allow for a very limited amount of radial play between the disk 16 and the disk support 18. The slight radial play is desirable to assure proper and uniform distribution of a light film of silicone oil. In that regard, it is desirable that before being placed into use the disk 16 and seating surface 16 are coated with a film of silicone oil to enhance the seal and assure leakproof operation. The amount of play permitted between the disk and its support should not be great enough as to cause possible variations in the operating characteristics of the valve during the operating cycles of the valve. By way of example, we have found that the maximum amount of play of the order of 0.020″ is acceptable although in most instances even less play is adequate.

The upstream, radially extending surface 42 of each of the wings 40 is beveled in a downstream direction to define generally a dished configuration against which the upstream face of the disk 16 may rest when the disk 16 has been flexed to a fully opened position shown in FIG. 3. The diameter of the disk 16 is less than the diameter defined by the wings 40 and there is substantial circumferential spacing between the wings 40 to provide a substantial area for fluid flow past the disk 16 and disk support 18 to the outlet, as described below.

The outlet section 14 of the housing 10 includes a rear wall 44 and integral sidewall 46. The disk support 18 is mounted to the outlet section 14 by a threaded opening 48 in the rear wall 44 of the outlet section 14 into which the threaded post 32 of the disk support 18 is screwed. The outlet section 14 may be provided with an internally threaded extension 50 to provide additional stability and rigidity for the threaded post 32.

The rear wall 44 of the outlet section is formed to include a plurality of circumferentially spaced outlet apertures 52. At least four and preferably six or more outlet apertures 52 are provided, each being as large as is practically possible within the dimensions of the outlet section 14 so as to provide a maximum cross-sectional area for outlet flow. The outlet apertures 52 are arranged generally in line with the periphery of the disc. As shown, the outlet apertures 52 lie on a circle which is generally aligned with the annular flow region formed about the periphery of the disk 16 with the internal sidewall of the inlet section 12. Thus, the flow path from the disk to the outlet is substantially straight and the size and arrangement of outlet apertures 52 is substantially larger than the narrowest restriction through the valve so that back pressure at the outlet is avoided.

In use, the valve will normally maintain the configuration shown in FIG. 2 when there is no pressure differential across the valve or if the pressure differential is less than the cracking pressure for the valve. In that configuration the disk 16 will be slightly dished because of its engagement with the disk support 18 on the downstream side of the disk 16 and engagement of the peripheral margin of the upstream side of the disk with the concave seating surface 26. Once the cracking pressure differential has been reached the peripheral sealing contact between the disk 16 and seating surface 26 is disrupted and fluid will flow through the valve. The flow direction is through inlet passageway 22, between the upstream surface of disk 16 and the seating surface 26 to the flow annulus (illustrated at 54 in FIG. 5) and then to the outlet apertures 52. Should any of the operating parameters of the valve vary from that which is desired for the particular application, it is a simple matter to adjust the axial position of the disk support 18 by rotating the thredded post 32. Adjusting the axial position of the disk support 18 caused more of a dished shape and the disk 16 increases the bias on the disk 16 and raises the cracking pressure needed to open the valve. Additionally, shifting of the disk support 18 toward and away from the seating surface 26 also serves to slightly restrict or increase the flow area between the disk 16 and seating surface 26 to provide additionally adjustable parameter for the valve. Thus, by the simple expedient of adjusting the threaded post 32 the operating characteristics of the valve can be adjusted to suit the particular environment and use with a high degree of precision.

FIGS. 7 and 8 illustrate a modified form of adjustable disk support which includes a threaded post 60 and a pin 62 at the inner end of the post 60. In this embodiment the disk 16 is provided with a socket 64 formed within the central boss 28 on the disk. The pin 62 is received within the socket 64. The downstream end of the pin has a means by which the pin can be easily adjusted such as a thumbscrew 66, screw slot or a combination of the two. In this embodiment the wings are omitted and the disk is permitted to flex freely, within the limits of its own resilience, once the cracking pressure has been reached.

FIGS. 9 and 10 illustrate another embodiment of the invention in which the disk support includes a threaded post 70 having a mushroom-like head 72. The head 72 has a socket 74 which receives the central boss 28 of the disk. The head is contoured so as to support the disk when the disk flexes to a more dished configuration under the influence of a pressure differential in the flow direction.

Thus, I have described improvements in flexible disk check valves by which the prior difficulties which such valves have presented may be overcome. The operating characteristics for a particular valve no longer need be controlled entirely in the manufacturing process. As a result difficulties in manufacturing such valves to extremely dimension and tolerances is no longer required. Additionally the valve enables fine tuning and adjustment so that it can be operated over a range of characteristics and with a high degree of precision. It should be understood, however, that the foregoing description of the invention is intended merely to be illustrative thereof and that other embodiments and modifications may be apparent to those skilled in the art without departing from the spirit.

Having thus described the invention what I desire to claim and secure by letters patent is:

1. A check valve comprising:
   a housing defining a chamber, the housing having an inlet and an outlet, said inlet extending along a central axis;
   said outlet being displaced transversely from the central axis;
   a valve seat surface formed within the housing coaxially about the inlet;
   a flexible, resilient disk adapted to bear against the valve seat surface in a dished configuration in which the peripheral edge and peripheral margin of the disk normally engages the valve seat surface;
   means for supporting the disk from the downstream side of the disk, said means comprising a post mounted to the housing downstream of the disk, the post being disposed axially along the central axis, the post having a head end for engaging and supporting the disk in a manner which enables the peripheral portion of the disk to flex, said disk supporting means being constructed and arranged as to bias the disk toward the seating surface to seal at least the peripheral edge of the disk against the seating surface; and
   means mounting the post to the housing for movement toward and away from the seating surface and along the central axis for varying the degree to which the disk is biased toward the seating surface and for varying the surface area of engagement of the disk with the seat.

2. A check valve as defined in claim 1 further comprising:
   said post being threaded into said housing and having a portion exposed exteriorly of said housing thereby enabling the axial position of the post to be adjustable exteriorly of the housing.

3. A check valve as defined in claim 2 further comprising:
   said housing having a boss extending in a downstream direction from the housing, said boss being internally threaded and receiving the threaded end of the post.

4. A check valve as defined in claim 1 wherein said post further comprises:
   the head end of the post being formed to define a pin;
   the disk having a socket formed at its center, the disk being mounted on the pin with the pin being received in the socket.

5. A check valve as defined in claim 1 further comprising:
   said outlet being formed in the housing downstream of the disk and being constructed so as to be in alignment with the periphery of the disk;
   the flow area defined by the outlet being greater that any other flow area defined through said valve.

6. A check valve as defined in claim 5 further comprising:
   said valve chamber being circular cross-section and defining a flow annulus between the internal periphery of the chamber and the periphery of the disk when the disk is flexed to an open configuration;
   said outlet means being in registry with said flow annulus.

7. A check valve comprising:
   a housing defining a chamber, the housing having an inlet and an outlet;
   a valve seat surface formed with the chamber about the inlet;
   a flexible, resilient disk adapted to bear against the valve seat surface in a dished configuration in which the peripheral margin of the disk normally engages the valve seat surface;

means for biasing the disk toward the seating surface to seal the periphery of the disk against the seating surface;

means for varying the degree to which the disk is biased toward the seating surface said means for varying the degree of bias of the disk comprising means for supporting said disk, said disk support means being movable toward and away from the seating surface;

said support means further comprising a post having a head end facing the valve seat surface, the head end of the post having means for supporting the disk to enable a peripheral portion of the disk to flex;

said post further comprising a threaded portion; and said head being mounted to one end of the threaded portion, the head having a central platform and plurality of wings extending radially outwardly from the central platform, the upper edges of the radial wings being beveled to defined a dish-like locus.

8. A check valve as defined in claim 7 further comprising:

the inner ends of each of the radial wings being spaced radially from the center of the platform thereby defining a socket;

the disk having a central boss extending from its downstream side, the boss being received within the socket on the post head.

9. A check valve comprising:

a housing defining a chamber, the housing having an inlet and an outlet;

a valve seat surface formed with the chamber about the inlet;

a flexible, resilient disk adapted to bear against the valve seat surface in a dished configuration in which the peripheral margin of the disk normally engages the valve seat surface;

means for biasing the disk toward the seating surface to seal the periphery of the disk against the seating surface;

means for varying the degree to which the disk is biased toward the seating surface;

said means for varying the degree of bias of the disk comprising means for supporting said disk, said disk support being movable toward and away from the seating surface;

said support means further comprising a post having a head and facing the valve seat surface, the head end of the post having means for supporting the disk to enable a peripheral portion of the disk to flex;

said means for supporting the disk further comprising a head mounted at the head end of the post, the head having a central socket and a supporting surface which define a disk-like locus, the diameter of the head being smaller than that of the disk.

10. A check valve comprising:

a housing defining a chamber, the housing having an inlet and an outlet, said inlet extending along a centeral axis;

a valve seat surface formed within the housing coaxially about the inlet;

a flexible, resilient disk adapted to bear against the valve seat surface in a dished configuration in which the peripheral margin of the disk normally engages the valve seat surface;

means for supporting the disk from the downstream side of the disk, said means comprisings a post mounted to the housing downstream of the disk, the post being disposed along the central axis, the post having a head end for engaging and supporting the disk in a manner which enables the peripheral portion of the disk to flex, said disk supporting means being constructed and arranged to bias the disk toward the seating surface to seal the periphery of the disk against the seating surface;

means mounting the post to the housing for movement toward and away from the seating surface and along the central axis for varying the degree to which the disk is biased toward the seating surface;

said outlet being formed in the housing downstream of the disk and being constructed so as to be in alignment with the periphery of the disk;

the flow area defined by the outlet being greater than any other flow area defined through said valve;

said valve chamber being circular in cross-section and defining a flow annulus between the internal periphery of the chamber and the periphery of the disk when the disk is flexed to an open configuration;

said outlet means being in registry with said flow annulus;

the outlet comprising a plurality of aperatures formed in the housing downstream of the flow annulus, the apertures being disposed substantially in alignment with the flow annulus.

* * * * *